US009324365B2

(12) United States Patent
Hametner

(10) Patent No.: US 9,324,365 B2
(45) Date of Patent: Apr. 26, 2016

(54) MULTI-LANGUAGE BUFFERING DURING MEDIA PLAYBACK

(75) Inventor: Dieter Hametner, Karlsruhe (DE)

(73) Assignee: NERO AG, Karlsbad (DE)

( * ) Notice: Subject to any disclaimer, the term of this patent is extended or adjusted under 35 U.S.C. 154(b) by 1218 days.

(21) Appl. No.: 13/196,918

(22) Filed: Aug. 3, 2011

(65) Prior Publication Data

US 2012/0035913 A1 Feb. 9, 2012

Related U.S. Application Data

(60) Provisional application No. 61/370,589, filed on Aug. 4, 2010.

(30) Foreign Application Priority Data

Sep. 10, 2010 (EP) .................................. 10176177

(51) Int. Cl.
*G06F 17/20* (2006.01)
*G11B 20/10* (2006.01)
(Continued)

(52) U.S. Cl.
CPC ........ *G11B 20/10527* (2013.01); *G06F 9/4448* (2013.01); *G11B 27/105* (2013.01); *G11B 27/329* (2013.01); *G11B 2020/10629* (2013.01);
(Continued)

(58) Field of Classification Search
CPC .......................... G06F 9/4448; G11B 20/10527
USPC ............................................................ 704/8
See application file for complete search history.

(56) References Cited

U.S. PATENT DOCUMENTS 6,757,023 B2 * 6/2004 Chien et al. .................... 348/468
7,051,360 B1 * 5/2006 Ellis et al. ..................... 725/136
(Continued)

FOREIGN PATENT DOCUMENTS

EP 0917143 A1 * 5/1999 ....... G11B 20/10527
JP 2007-295464 A 11/2007
(Continued)

OTHER PUBLICATIONS

Official Communication issued in corresponding European Patent Application No. 10176177.3, mailed on Aug. 26, 2011.

*Primary Examiner* — David Hudspeth
*Assistant Examiner* — Oluwadamilola M Ogunbiyi
(74) *Attorney, Agent, or Firm* — Keating & Bennett, LLP

(57) ABSTRACT

A data processor for processing a data stream having audio and video data has an input buffer for buffering the data stream; a data stream analyzer for analyzing the data stream for finding information on a plurality of language-specific content in different languages; a queuing buffer for queuing a plurality of parallel queues, each queue having only language-specific content in the same language; and a feeder for feeding a selected queue in accordance with a language selection signal to a subsequent processing stage, wherein a non-selected queue is not fed by the feeder. Also disclosed are a corresponding method for processing a data stream and a computer-readable digital storage medium. The data processor or the method for processing a data stream reduces a delay experience by a user when switching from one language-specific content to another language-specific content in a different language, even if the processing is done on an architecture that needs ample data buffering to compensate for variations in the system load, such as a personal computer system with the standard operating system.

17 Claims, 6 Drawing Sheets

(51) Int. Cl.
  *G06F 9/44* (2006.01)
  *G11B 27/10* (2006.01)
  *G11B 27/32* (2006.01)

(52) U.S. Cl.
  CPC ........... *G11B 2020/10638* (2013.01); *G11B 2020/10675* (2013.01); *G11B 2020/10685* (2013.01); *G11B 2020/10759* (2013.01); *G11B 2020/10796* (2013.01); *G11B 2220/2541* (2013.01); *G11B 2220/2562* (2013.01)

(56) References Cited

U.S. PATENT DOCUMENTS

| | | | |
|---|---|---|---|
| 7,117,231 B2* | 10/2006 | Fischer et al. | |
| 8,386,621 B2* | 2/2013 | Park et al. | 709/228 |
| 8,639,830 B2* | 1/2014 | Bowman | 709/231 |
| 2005/0259977 A1* | 11/2005 | Chen | 386/125 |
| 2006/0031556 A1* | 2/2006 | Evans | 709/231 |
| 2009/0121740 A1* | 5/2009 | Hauke | 326/30 |
| 2009/0169183 A1* | 7/2009 | Fujinami | G11B 27/005 386/248 |
| 2009/0279867 A1* | 11/2009 | Hamada | G11B 27/102 386/248 |
| 2010/0011405 A1* | 1/2010 | Wu | 725/131 |
| 2010/0098389 A1 | 4/2010 | Shimada | |
| 2010/0106499 A1* | 4/2010 | Lubowich et al. | 704/235 |
| 2010/0129052 A1* | 5/2010 | Fujinami | G11B 27/005 386/241 |
| 2012/0010886 A1* | 1/2012 | Razavilar | 704/246 |
| 2012/0030436 A1* | 2/2012 | Panje | 711/156 |

FOREIGN PATENT DOCUMENTS

| | | |
|---|---|---|
| WO | 2004/077811 A2 | 9/2004 |
| WO | WO 2006115606 A2 * | 11/2006 |
| WO | WO 2009150578 A2 * | 12/2009 |

* cited by examiner

MULTI-LANGUAGE BUFFERING DURING MEDIA PLAYBACK

CROSS-REFERENCE TO RELATED APPLICATIONS

This application claims the benefit of U.S. Provisional Application No. 61/370,589 filed on Aug. 4, 2010. The content of the foregoing application is incorporated herein by reference in its entirety. This application further claims priority from European Patent Application No. 10176177.3, which was filed on Sep. 10, 2010, and is incorporated herein in its entirety by reference.

BACKGROUND OF THE INVENTION

The field of the present invention relates to a data processor for processing a data stream having audio and video data, and to a method for processing a data stream having audio and video data, such as the ones used for presenting a multimedia content stored on an information carrier.

Home entertainment has become a popular pastime for many people since its introduction in the late 1970s, when home video became available to the wide public in the form of video home system (VHS) or Betamax video cassettes. The terms home video and home entertainment nowadays comprise current optical disc formats like Digital Versatile Disc (DVD) and Blu-ray (BD) disc. The home video industry also comprises methods of digital distribution of pre-recorded media over a communications network, such as video-on-demand. The DVD format has become one of the most popular formats for the distribution of theatrically released films. The Blu-ray disc format may be regarded as a successor to the DVD format.

While dedicated DVD players or Blu-ray disc players exist, it is typically also possible to use a standard personal computer (PC) equipped with a suitable DVD reader or Blu-ray disc reader. In a large number of cases, these PCs are equipped with a standard operating system that is not dedicated to handle real-time tasks. In a non-real time operating system it cannot be predicted when a certain task will be performed, because a scheduling of a task depends heavily on the current system load. In order to cope with a variable system load, current solutions for DVD or Blu-ray disk playback on a PC resort to buffering large amounts of data in the stream processor, or upstream thereof, to allow a smooth playback of audio and video data. The buffer provides a constant data stream to the stream processor in a manner substantially independent from the current system load. This scheme works as long as the buffer knows or can predict, at the time of buffering certain data, which type of data will be needed at a time of retrieving the buffered data from the buffer.

Especially with the DVD and Blu-ray disc formats, the user typically has a choice of two or more languages for an audio track or a subtitle to be played or displayed along with a video track of the audiovisual presentation. If the user changes the audio or subtitle language, a noticeable delay occurs (4-5 seconds) because the already buffered data (with the previous language settings) will be presented first before the new data stream reaches the display or the speakers connected to the personal computer.

In low latency hardware implementations or in dedicated real-time operating system environments, the delay observed when switching the audio track or the subtitle from one language to another, is typically hardly noticeable, because such implementations do not need to use large buffers.

SUMMARY

According to an embodiment, a data processor for processing a data stream having audio and video data may have an input buffer for buffering the data stream; a data stream analyzer for analyzing the data stream for finding information on a plurality of language-specific contents in different languages; a queuing buffer for queuing a plurality of parallel queues, each queue comprising references to language-specific contents in the same language; a feeder for extracting data from a selected queue in accordance with a language selection signal and for feeding the extracted data to subsequent data processing stages, wherein a non-selected queue is not fed to the subsequent data processing stages.

According to another embodiment, a method for processing a data stream having audio and video data may have the steps of buffering the data stream in an input buffer; analyzing the data stream for finding information on a plurality of language-specific contents in different languages; appending a particular language-specific content to a queue of a plurality of parallel queues, each queue comprising references to language-specific content in the same language, the particular language-specific content being appended to a parallel queue of the same language; retrieving a language-specific content from a parallel queue selected in accordance with a currently valid language selection signal; feeding the retrieved language-specific content to a subsequent processing stage, wherein language-specific content of a non-selected parallel queue is not fed to the subsequent processing stage.

According to another embodiment, a computer readable digital storage medium may have stored thereon a computer program code for performing, when running on a computer, a method for processing a data stream having audio and video data, which may have the steps of buffering the data stream in an input buffer; analyzing the data stream for finding information on a plurality of language-specific contents in different languages; appending a particular language-specific content to a queue of a plurality of parallel queues, each queue comprising references to language-specific content in the same language, the particular language-specific content being appended to a parallel queue of the same language; retrieving a language-specific content from a parallel queue selected in accordance with a currently valid language selection signal; feeding the retrieved language-specific content to a subsequent processing stage, wherein language-specific content of a non-selected parallel queue is not fed to the subsequent processing stage.

According to an embodiment, a data processor for processing a data stream having audio and video data comprises an input buffer for buffering the data stream; a data stream analyzer; a queuing buffer; and a feeder. The data stream analyzer is adapted and useable for analyzing the data stream for finding information on a plurality of language-specific contents in different languages. The queuing buffer is adapted and useable for queuing a plurality of parallel queues, each queue having references to language-specific contents in the same language, only. The feeder is adapted and useable for extracting data from a selected queue in accordance with a language selection signal and for feeding the extracted data to a subsequent data processing stage, wherein a non-selected queue is not fed to the subsequent processing stage by the feeder.

With the proposed data processor it is possible to postpone a decision regarding which language-specific content is to be presented to a point after the buffering or even downstream thereof. The queuing buffer contains not only a single queue for language-specific contents in a selected language, but the plurality of parallel queues, wherein each one of the plurality of parallel queues contains language-specific contents in a particular language. Thus, a buffer is still present to compensate for fluctuations of the system load, which could affect a disc reading process or some other processing task upstream of the queuing buffer. Since the language selection is made at the output of the queuing buffer, the latency of the queuing buffer does not need to be taken into account for a language-switching action. The queuing buffer may still have a size that is sufficient for compensating for typical variations of the system load and thus to guarantee a feeding rate of the feeder and/or the stream processor. At this point, typically no data copying takes place. The queues in the queuing buffer contain references to the language-specific data items provided by the input buffer so that not much additional memory is needed for buffering this administrative data. The feeder and the subsequent processing stage may be configured to have a relatively small latency, for example by assigning a high task priority to the feeder and/or the subsequent processing stage, as it is usually possible with multitasking operating systems. In some implementations of the data processor it is conceivable that computationally intensive tasks of e.g. the rendering process are performed on dedicated hardware, such as a sound processor on a sound card or a graphic processor on a graphics card. In any event, the remaining latency downstream of the output of the queuing buffer is considerably smaller than the buffer length of the queuing buffer, so that the user experiences an almost immediate reaction when selecting a new language for e.g. the sound track or the subtitle.

According to another embodiment, a method for processing a data stream having audio and video data may have the actions of: buffering the data stream in an input buffer; analyzing the data stream for finding information on a plurality of language-specific contents in different languages; appending of particular language-specific content to a queue of a plurality of parallel queues, each queue having only language-specific content in the same language, the particular language-specific content being appended to a parallel queue of the same language; retrieving a language-specific content from a parallel queue selected in accordance with a currently valid language selection signal; and feeding the retrieved language-specific content to a subsequent processing stage, wherein language-specific content of a non-selected parallel queue is not fed to a subsequent processing stage.

In embodiments according to the teachings disclosed herein the data stream may be decrypted by a data stream decrypter upstream of the data stream analyzer, e.g. prior to analyzing the data stream. Usually, the entire data stream needs to be decrypted, even though only a few selected parts of the data stream will ultimately be used (such as the audio track in the language that is currently being selected by the viewer—the other audio tracks, even though not needed, are typically decrypted anyway). Typically, the decryption reveals information within the data stream indicating that a particular section of the data stream contains language-specific contents in the particular language, i.e. the data typically needs to be decrypted first in order to access the information relative to the language-specific content.

In embodiments according to the disclosed teachings, the data processor may further comprise a time stamp generator adapted to determine playlist time stamps for items to be queued in the plurality of parallel queues and to apply the playlist time stamps to the items. The method may comprise: determining playlist time stamps for items to be queued in the plurality of parallel queues, and applying the playlist time stamps to the items. The feeder may thus retrieve a particular item from one of the plurality of parallel queues on the basis of the playlist time stamp for the particular item. The playlist time stamp creates a common reference for the items that are queued in different ones of the plurality of parallel queues. Thus, the playlist time stamps facilitate a smooth switchover from the first language to a second language. A next item from the queue having language-specific contents in the new language will follow the previous item from the queue having language-specific contents in the old language with substantially no gap or overlap between the two items.

In embodiments the information of language-specific contents may be a program identifier (PID).

In embodiments according to the teachings disclosed herein, the input buffer may be adapted to store source packets (SP). The source packets are the data units as they are provided from a data source, such as a DVD, a Blue-ray disc, or a network. The source packet may still be encrypted or already decrypted.

In embodiments, the feeder may be further adapted to retrieve and discard expired content from the non-selected queue. In an analog manner, the method may further comprise retrieving and discarding expired language-specific content from non-selected queues. The queuing buffer is typically designed to receive data spanning a certain time interval. This time interval is a rolling interval which means that an interval start time and an interval end time change constantly during playback as the playback time progresses. This means that items in a queuing buffer older than the current playback time normally will not be used anymore, i.e. they have expired. Retrieving and discarding expired content from the non-selected queue(s) maintains the queuing buffer at a substantially constant size. During normal playback, the expired content is of no use, unless the user decides to rewind the data stream in which case the queuing buffer would need to be re-initialized.

In embodiments according to the disclosed teachings, the queuing buffer may be adapted to append items to a plurality of parallel queues in accordance with the information on the plurality of language-specific contents and an order defined by time stamps of corresponding sections of the data stream. In the context of the method for processing the data stream, the appending of a particular language-specific content to the queue in the same language may be done in accordance with the information on the language-specific contents and an order defined by a time stamp of a corresponding section in the data stream. Thus, data items may be appended to the queuing buffer in the order they will be retrieved by the feeder.

In embodiments the queuing buffer may be adapted to receive a plurality of references to input buffer items in the input buffer, so that the queuing of the plurality of queues is achieved by inserting a reference of the plurality of references according to the queuing scheme, the reference pointing to an input buffer item in the input buffer. In terms of the method for processing a data stream, the appending of a particular language-specific content to the queue in the same language may comprise: receiving a reference to an input buffer item, the input buffer item containing the language-specific content to be appended to the queue in the same language. The references in the queuing buffer to the input buffer allows to keep the actual data items in a single place during most of the data processing performed by the data processor or the method. At the same time, the entries in the queuing buffer that contain the references to the input buffer items may be sorted to a corresponding one of the plurality of parallel queues and brought in the order defined by e.g. the time stamps. Since the references to the input buffer item are typically substantially smaller in size than the input buffer items themselves, a smaller amount of data needs to be handled during the queuing (appending and retrieving) of the data items containing language-specific contents. Hence, the number of copy actions can be reduced to e.g. two, namely during the initial buffering of the data stream in the input buffer and during the provision of the selected queue to the feeder and/or the subsequent processing stage, unless the latter is capable of working directly on the input buffer.

In embodiments according to the teachings disclosed herein, the language-specific content may be one of an audio stream, a subtitle, a presentation graphic, an interactive graphic, and a credit section of an audio and video presentation.

In embodiments the data stream may originate from one of an optical disc, a magnetic disc, a hard drive, a network, a Digital Versatile Disc, and a Blu-ray disc.

According to an aspect of the teachings disclosed herein, a computer-readable digital storage medium may have stored thereon a computer program code for performing, when running on a computer, a method for processing a data stream having audio and video data, the method comprising: buffering the data stream in an input buffer; analyzing the data stream for finding information on a plurality of language-specific contents in different languages; appending a particular language-specific content to a queue of a plurality of parallel queues, each queue having a language-specific content in the same language, the particular language-specific content being appended to a parallel queue of the same language; retrieving a language-specific content from a parallel queue selected in accordance with a currently valid language selection signal; and feeding the retrieved language-specific content to a subsequent processing stage, wherein language-specific content of a non-selected parallel queue is not fed to the subsequent processing stage.

The data processor and the method according to the teachings disclosed herein may be used in conjunction with a framework that is dedicated to the processing of audio and video data. The framework may comprise and define an application program interface (API) through which the data processor and the method according to the teachings disclosed herein may interact with the framework. In this manner, certain tasks may be performed by the framework, such as the tasks relative to the input buffer. The framework and its API may also allow replacing one or more of the framework's components by an enhanced, third-party component offering additional functionality.

Besides genuine video data, the term "video data" comprises interactive graphics, animation graphics, still images, subtitles and other visual elements.

BRIEF DESCRIPTION OF THE DRAWINGS

Embodiments of the invention will be described referring to the accompanying drawings, in which.

DETAILED DESCRIPTION OF THE INVENTION

Figure 1:
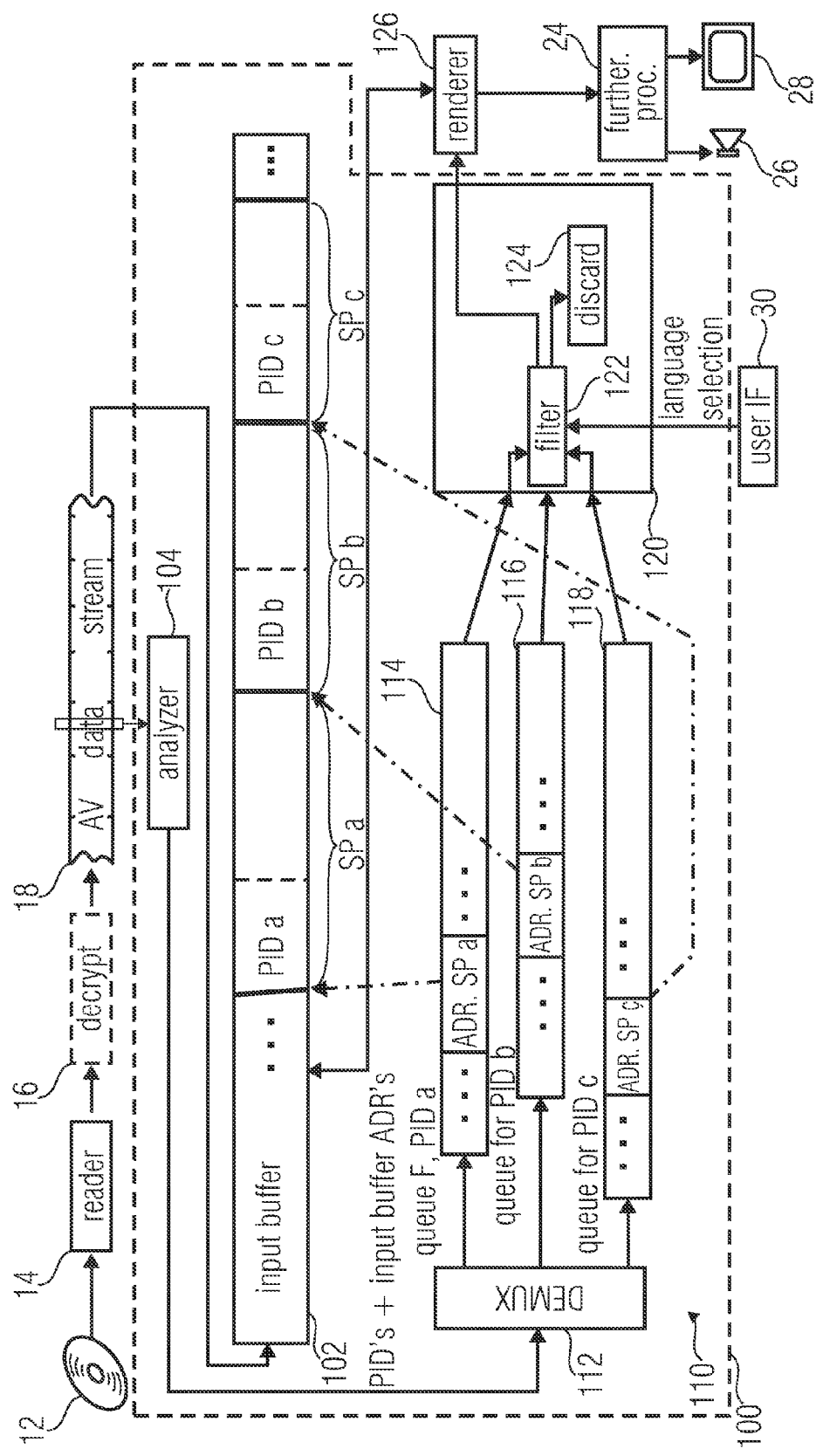
FIG. 1 shows a schematic block diagram of a data processor for processing a data stream having audio and video data according to the teachings disclosed herein.

FIG. 1 shows a schematic block diagram of a data processor according to the teachings disclosed herein and components connected thereto. A storage medium 12 such as a DVD or a Blu-ray disc contains information stored thereon that can be read by means of a reader 14. Depending on the type of the information stored on the storage medium 12, the information may be encrypted in order to discourage unauthorized copying of the storage medium 12. An optional decrypter 16 may be used if the information is encrypted. Whether or not a decryption took place, the reading process of the storage medium uses a data stream 18 having audio and video data.

A data processor 100 for processing the data stream 18 forms an aspect of the teachings disclosed herein. The data stream 18 is fed to an input buffer 102. In case the original data stream provided by the reader 14 was encrypted, the encrypted data stream could have been fed directly to the input buffer 102 and the decryption performed by decrypter 16 could be performed on the items buffered in the input buffer 102. The stream data consists of source packets (SP) of a fixed size containing a transport packet (TP) extra header, a transport stream (TS) header, and the payload data. From the TS header a program identifier (PID) can be retried. Especially data streams containing data of e.g. a feature film or a movie picture often have several audio tracks and/or subtitles in different languages. Among others, the program identifier serves to identify data packets belonging to the various languages. Thus, the input buffer 102 typically contains source packets having different program identifiers indicating that the various source packets comprise language-specific content corresponding to a respective value of the program identifier. In an illustrative manner, the input buffer 102 stores three source packets having different program identifiers a, b, and c. The corresponding source packets are referenced by SPa, SPb, and SPc.

An analyzer 104 analyzes the data stream 18 either prior to a buffering of the data stream 18 in the input buffer 102 or after this buffering, i.e. the analyzer 104 analyzes the data contained in the input buffer 102. The analyzer 104 analyzes the data stream for finding information on a plurality of language-specific contents in different languages. As explained, the program identifier may be evaluated to obtain the information on language-specific contents. Typically, the analyzer 104 determines a position or address of a particular source packet having a particular program identifier within the input buffer 102, so that the particular source packet may be located in processing stages subsequent to the analyzing. The analyzer 104 produces data elements comprising the value of the program identifier of a source packet and the corresponding address of a source packet in the input buffer 102. These data elements are then transmitted to a queuing buffer 110. The implementation of the queuing buffer 110 shown in FIG. 1 as a possible example comprises a demultiplexer 112 at which the data elements transmitted from the analyzer are received. The demultiplexer (or a similar component providing a comparable functionality) distributes the received data elements to one of a plurality of parallel queues 114 116, and 118. The distribution is based on the value of the program identifier, so that data elements having identical program identifiers are queued in the same one of the plurality of parallel queues. The entries in the parallel queues 114, 116, and 118 each comprise a reference to a position in the input buffer 102, the reference being a memory address or an index corresponding to the position in the input buffer 102.

The data processor 100 also comprises a feeder 120. The feeder 120 is connected to outputs of the parallel queues 114, 116, and 118. On the basis of the language selection received from a user interface 30 a filter 122 in the feeder 120 determines which one of the plurality of parallel queues 114, 116 and 118 shall be forwarded for subsequent processing an ultimate output to a user. By means of the language selection one or several queues of the plurality of parallel queues is selected, for example, a first queue containing data for playing a selected audio track and a second queue for displaying subtitles in a certain language. The selected queue(s) is/are transmitted to a renderer 126. The renderer 126 uses the references contained in the data elements buffered in the plurality of parallel queues to query the input buffer 102 for the data stored at the position indicated by the reference to the input buffer. The renderer 126 processes the data to make it fit for playing it or displaying it to a user. The renderer 126 may be a low-latency software module or a dedicated hardware component such as a sound processor or a graphic processor. The output of the renderer 126 may undergo further processing of various components 24, such as a digital-to-analog conversion or filtering. In case the rendered data is a sound, it will be played by means of a loudspeaker 26. A display 28 will be used if the rendered content comprises visual data, such as a subtitle or an interactive graphic (IG). The task of the renderer 126 may comprise decoding the language-specific content according to a decoding scheme, e.g. MP3, MPEG 4, etc.

The feeder 120 comprises a discarding unit 124 to which non-selected queues are discarded. Due to the time-dependent nature of playing and/or displaying audio-visual data, entries in the queuing buffer 110 may expire when the time at which they should have been played/displayed has already lapsed. The space occupied by expired entries may be freed by the discarding unit 124, so that new space is available for newly arriving entries transmitted from the analyzer 104 and the de-multiplexer 112. The queuing buffer 110 typically buffers an amount of data that is worth a certain time interval past the current rendering time so that rendering of the renderer 126 could continue during the time interval even if the queuing buffer 110 is not fed with newly arriving data elements from the analyzer 104. The renderer 126 and the discard engine 124 may inform the input buffer 102 about source packets that have already been rendered (by renderer 126) or discarded by discarding unit 124). The input buffer 102 may then mark the corresponding buffer positions as free. In the alternative, the queuing buffer 105 could provide this functionality.

Figure 2:
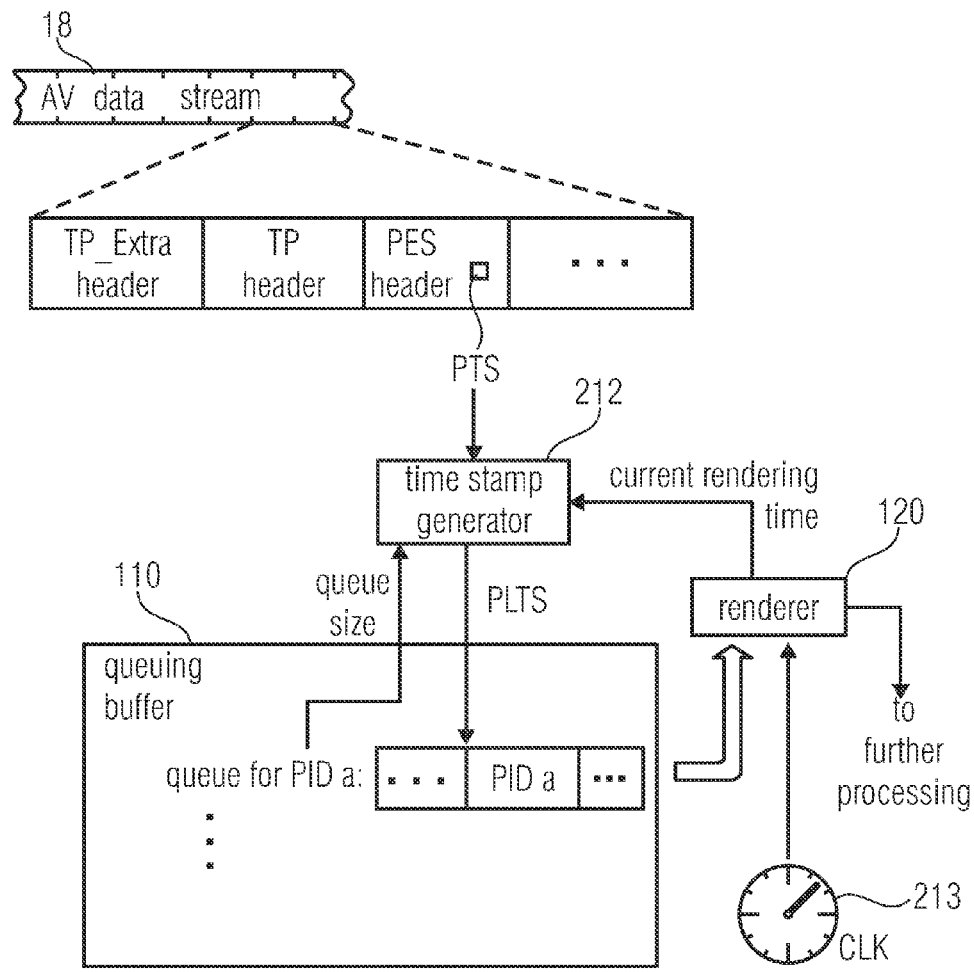
FIG. 2 shows in a schematic manner the processing of the time stamps contained in the data stream according to an aspect of the disclosed teachings.

FIG. 2 illustrates the handling of a time stamp contained in a source packet of the data stream 18. A source packet originating from a Blu-ray disc typically has the structure shown in FIG. 2 and comprises a transport packet extra header, a transport packet header, a program elementary stream (PES) header and further data, in particular the payload data. The PES header typically comprises a presentation time stamp (PTS) which is evaluated by a time stamp generator 212. The time stamp generator 212 may be a component of the analyzer 104 or of the queuing buffer 110 or of another component. In the alternative, the time stamp generator 212 could be a component on its own. The time stamp generator 212 is adapted to determine a playlist time stamp (PLTS) as a function of the presentation time stamp and optional other data such as the queue size provided by the queuing buffer 110 or the queue corresponding to the program identifier of the source packet in the data stream 18. The playlist time stamp could also be a function of a current rendering time provided by the feeder 120. By adding a queue time interval depending on the current queue size to the current rendering time, a future rendering time can be determined for the content of a source packet to be appended to the queue. The feeder 120 may be connected to a clock 213 to synchronize the rendering process with a timebase so that the rendering occurs at the proper speed.

The playlist time stamp may either be inserted to an entry in the queue or the corresponding program identifier within the queuing buffer 110, or the playlist time stamp may be used as an index or an address of the entry in the queue. Each queue in the queuing buffer 110 reflects a time interval of a specific duration subsequent to the current rendering time. Thus, each position within the queue can be mapped to a specific time within the time interval.

Figure 3:
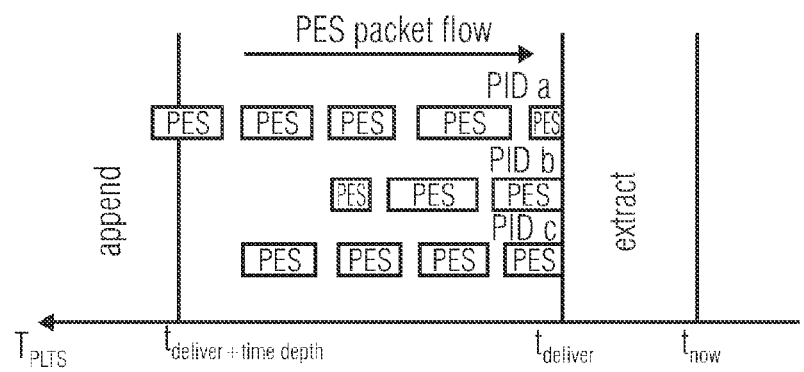
FIG. 3 illustrates the operation of a queuing buffer.

FIG. 3 illustrates the contents of the queuing buffer 110 over a time-line. In the illustrated example, the queuing buffer 110 comprises three parallel queues for PID=a, PID=b, and PID=c, respectively. In this queuing buffer, the queued elements are program elementary stream (PES) packets, which are appended from the left to a suitable one of the three queues. If the queue was initially empty, a first PES packet is appended as a time instant $t_{deliver}$ (provided its time stamp matches the time instant $t_{deliver}$). Further PES packets are appended to the left of already buffered packets, so that the queue grows from right to left until the queue has reached a size corresponding to a maximal time interval for the queuing buffer, the maximal time interval being called time depth. PES packets exceeding the time depth are typically currently not appended to the queue. In order to avoid a congestion, the analyzer 104 and/or the reader 14 may be instructed to slow down or momentarily halt their processing tasks.

At the right end of the queuing buffer, the buffered packets are extracted at the time $t_{deliver}$. The extraction and possible further processing such as decoding and digital-to-analog conversion typically needs some time so that PES packets extracted at $t_{deliver}$ are played or displayed at an instant $t_{now}$. Depending on the implementation and configuration of a system for DVD or Blu-ray playback, the time interval between $t_{deliver}$ and $t_{now}$ may be small so that a user would not be aware of a noticeable delay when the user decides to switch from one language-specific content to another language-specific content. Switching from one language-specific content to another language-specific content involves ceding to render PES packets extracted from one queue (e.g. PIDa), and starting to render PES packets extracted from another queue (e.g. PIDb). The queuing buffer 110 implements a multi-queue buffer and a selection of one or more queues is made at the extraction end of the parallel queues. This circumvents the necessity to take the time depth of the queuing buffer 110 into account when switching from one queue to another. The time depth of the queuing buffer 110 typically needs to be relatively long in order for the queuing buffer to be able to compensate for fluctuations in the data rate achieved by the reader 14 and/or the decrypter 16. The proposed queuing buffer 110 exploits the fact that the data stream 18 comprises a closed set of possible program identifiers from which the user can select one or more. This a-priori knowledge about language-specific content available in the data stream 18 allows the data processor according to the teachings disclosed herein to buffer all the language-specific content in parallel and to decide only later which one(s) to render and which one(s) to discard. Any latency downstream of the queuing buffer 110 is almost negligible and anyway hardly noticeable to a user.

Figure 4:
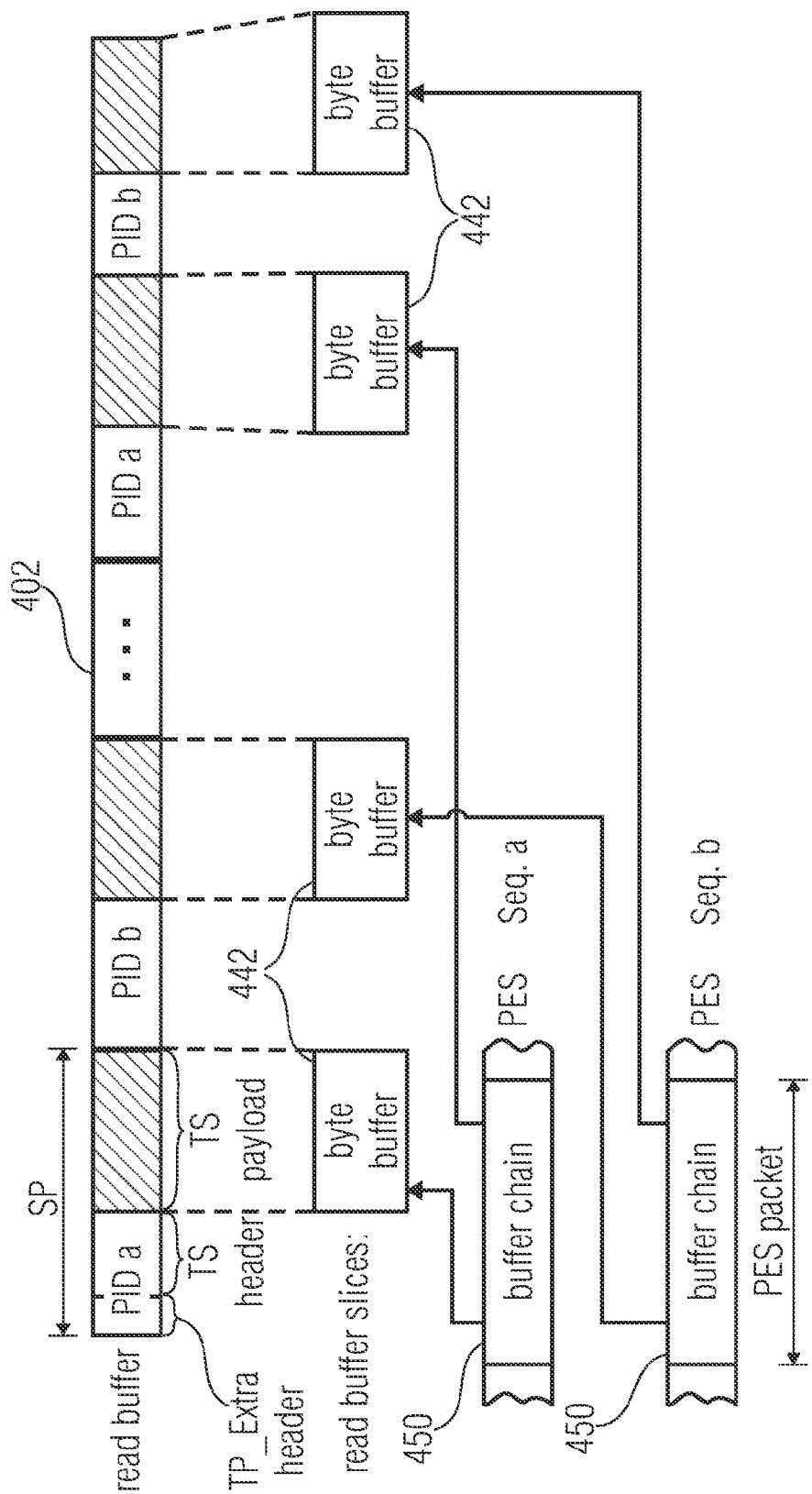
FIG. 4 illustrates a concept of buffer slicing and buffer chaining according to an aspect of the teachings disclosed herein.

FIG. 4 illustrates the buffering scheme according to an aspect of the teachings disclosed herein. Some encoding standards for multimedia data, such as the one used for the Blu-ray disc, employ several types of packets. Packets that are read from the storage medium 12 are usually called source packets (SP). These source packets may be formatted to form packets suitable for further processing, in particular decoding. In the context of the Blu-ray disc, these further packets are called program elementary stream packets. Unfortunately, one PES packet spans several source packets. In order to parse and process the PES packets without copying the data, a proposed new data structure may be helpful. A PES packet typically only contains a part of each source packet, namely the so-called transport stream payload part. The proposed data structure chains the parts of several source packets in the right sequence together, so that a PES packet can be accessed in a sequential way. This data structure is called a buffer chain 450 in FIG. 4. FIG. 4 demonstrates how a single read buffer 402, which contains the one and only copy of the data, is subdivided into source packet slice buffers 442 and these source packet slice buffers 442 are chained together to form the sequential view onto a PES packet, by using the buffer chain data structure 450.

The ability to slice a big buffer into several sub-portions and to chain these sub-portions in a desired order may be achieved by the introduction of suitable software classes. A first class may be regarded as a stream reader. In the context of the disclosed teachings, the stream reader is used to parse the packet header structures and supports storage policies for the data it parses. For example, the input buffer 102 or the read buffer 402 (which may be one on the same buffer, depending on the implementation) may be suited to be used as storage policy for the stream reader. This eliminates the need to copy the data into the stream reader for parsing.

The second class defines a buffer data structure usable for implementing the input buffer 102 and the read buffer 402. The buffer data structure supports splitting and slicing of the buffer into several additional buffers or sub-buffers. All these buffers share the same underlying data, but define new starting locations and sizes of the data they cover. Thus, it is possible to split a bigger buffer into lots of smaller buffers without the need to copy any data.

With these two classes and their corresponding functionalities, it is possible to split the data read from a file, network, etc. into source packets and later into PES packets without copying the data. It also allows parsing the TS headers without copying the data into the stream reader, because slices from the original input buffer 102 (where the data was written to initially) can be used as storage policies for each TS header stream reader. An interface of the buffer chain 450 typically fulfills the requirement of the storage provider for the stream reader in order to be able to parse the PES header. The PES header is parsed to determine the correct type of frame in the stream. The buffer chain data structure 450 is suitable to be used as an element member in the multi PID queuing as provided for by the queuing buffer 110.

A data exchange between the input buffer 102 and the queuing buffer 110 may be achieved by threads that read data from a single source and append the generated PES packets structures into the parallel queues 114, 116, 118 of the queuing buffer 110. When using the buffering scheme above, the data is read only once into the input buffer 102. No other data copying takes place before the data is handed to the renderer 126 or the further processing 24. Placing the PES packet representations, which would aggregate a buffer chain, into the queue does not involve any copying either.

In FIG. 4, two buffer chains 450 are shown, the upper buffer chain 450 providing a sequential view on a PES packet for the program identifier a (PID=a), the lower buffer chain 450 representing the sequential view on a PES packet for PIDb. The buffer chain 450 gathers the TS payload sections of several source packets within the input buffer or the read buffer 402 that belong to a single PES packet. The buffer chains 450 may themselves be part of the buffer structure, namely the queuing buffer 110 with its plurality of parallel queues 114, 116, 118.

Figure 5:
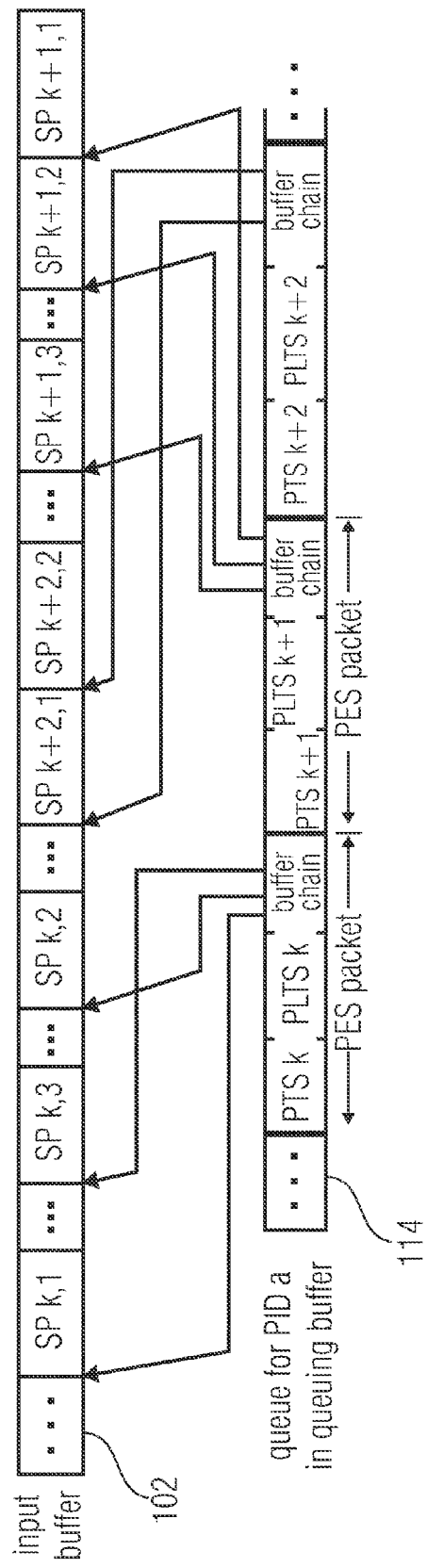
FIG. 5 illustrates a concept of referencing buffer entries via a second buffer containing buffer entry addresses.

FIG. 5 shows the queuing of the buffer chains 450 and the queuing buffer 110 and references from the buffer chains 450 to entries in the input buffer 102. For the sake of clarity, FIG. 5 illustrates the situation for a single program identifier. Also for the sake of clarity, only the payload portions of the source packets buffered in the input buffer 102 are depicted, i.e. omitting the various headers of the source packets.

As mentioned above, the source packets typically comprise a presentation time stamp (PTS) which may be transformed in a playlist time stamp (PLTS). Roughly, the time stamps determine the order in which PES packets, each resulting from the combination of several source packets, are to be decoded and their contents to be played or displayed to the user. In FIG. 5, three different time stamps are illustrated, namely k, k+1, k+2. Furthermore, the order in which several source packets are to be assembled to form a PES packet is also indicated in the source packet. Hence, the denomination "$SP_{a,1}$" refers to the source packet at presentation time stamp k which will be transformed to the playlist time stamp k, where this particular source packet is the first source packet for assembly into a PES packet having the time stamps k. Due to various reasons, the order of the source packets in the input buffer 102 may not be strictly increasing in terms of a playlist index and a source packet index. One of the reasons may be that a decrypting of the source packets may be distributed to several threads, possibly running on different processors.

The queue 114 for PIDa in the queuing buffer 110 addresses this situation by bringing the PES packets in the correct order upon appending the PES packets to the queue 114. This may be achieved by evaluating the playlist time stamp which may indicate an absolute playlist time. Accordingly, it may be apparent to the queuing buffer 110 at which position an arriving PES packet should be inserted into the queue 114. This is, for example, the case for the PES packet at time stamp k+1, which appears relatively late in the input buffer 102. Nevertheless, the PES packet k+1 is queued between the PES packets k and k+2.

As explained with respect to FIG. 4, the buffer chain contained in the PES packets allow to establish references from the PES packet to the payload data section of the various source packets within the input buffer 102, that is where the data is actually stored.

Figure 6:
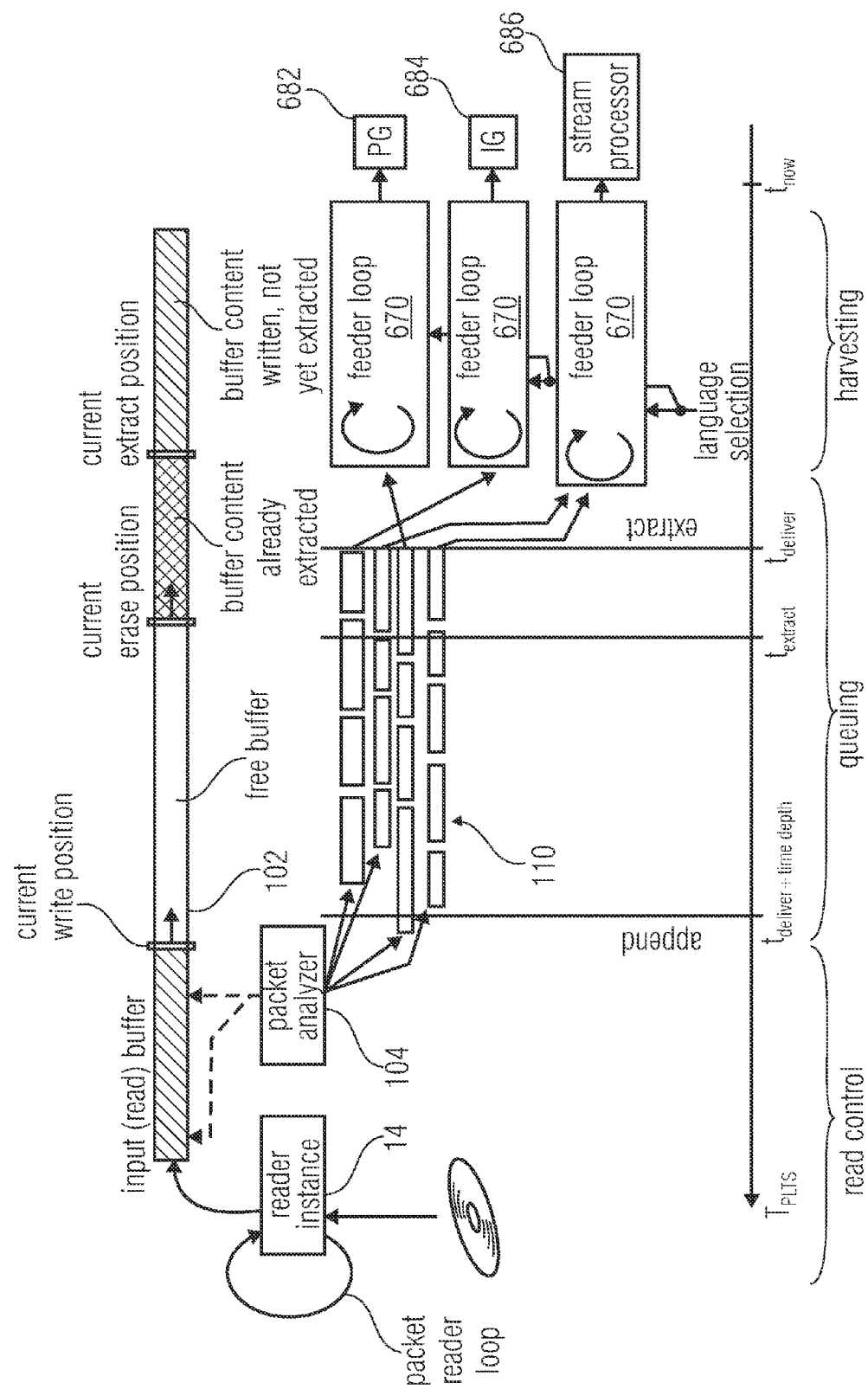
FIG. 6 shows an overview of a system or a process for playing back multimedia data streams having language-specific content in different languages.

FIG. 6 is an overview of the data processing according to the teachings disclosed herein and how the three major components are grouped together in relation to a stream processor and other components. The three major components are:
  read control, including the reader 14 and the packet analyzer 104,
  queuing, and
  harvesting.

The threading model for the streaming layer of the processing entity (PE) shown in FIG. 6 typically has at any given time a maximum number of threads, here four threads. A maximum of two threads are responsible for reading from the disc 12. In FIG. 6, only a single reading thread is shown. In case two reading threads are used, the two reading threads are synchronized by the Blu-ray disc file system (BDFS) layer. The reading thread(s) deliver(s) the "virtual" PES packets to the input buffer (read buffer) 102. Several options exist for implementing the input buffer 102. Without any loss of generality, the input buffer 102 shown in FIG. 6 is controlled by three cursors at different positions within the input buffer 102. The first cursor points to a current write position. New data arriving from the reader instance 14 is written to the input buffer 102 at the current write position and the current write position is then moved to the right. Another cursor points to a current extract position. As data is extracted from the input buffer 102, the current extract position moves to the right. A third cursor points to a current erase position. The buffer area to the left of the current erase position represents free buffer while the buffer area to the right of the current erase position contains buffer content that has already been extracted, but not yet been erased.

The packet analyzer 104 operates on the section of the input buffer 102 that contains active buffer data and provides information about source packets stored in the input buffer 102, in particular with respect to the program identifier and the presentation time stamp of each source packet. This information is used to fill the queuing buffer 110 with references (or pointers) to corresponding data items stored at various positions within the input buffer 102.

If one of the reading threads would deliver data too fast, the queuing buffer 110 would block further attempts to enter data to queues that are already saturated.

At the other end of the queuing buffer 110, feeder threads extract PES packets from the queues and copy their data to be used as input to further downstream processing entities. The feeder threads extract data only when it matches certain criteria (e.g. are not older than $t_{now}$ and $t_{extract}$). This shall ensure that not too much data is pushed into the downstream components. Alternatively, the downstream component could block the delivery of data.

The threads are typically not owned by the readers or the feeders. Instead, the threads will be set up by the read-control or the stream router. The number of threads will depend on the functionality built into the reader or feeder components. If it is feasible to implement the reader with multi-data source support then only one reader thread will be needed. The same holds for the harvesting components 670: If it can be built to feed the presentation graphics processor 682, the interactive graphic processor 684, and the stream processor 686 at once, then only one thread will be needed.

The decision which data is passed to the stream processor 686 (or the presentation graphics (PG) processor 682 or the interactive graphics (EG) processor 684) is decided in the corresponding one of the feeders 670. The decision is made on the basis of a language selection from the user and whether a program identifier of a certain queue matches the language selection. Having the feeder(s) make the decision ensures that enough data is buffered. It may be that too much data is buffered, but that does not hurt because the data had to be read and possibly decrypted, anyway. This allows for compensation of varying system loads, especially when they affect the reader instance 14 or the decrypter 16. At the same time, the decision what to decode is made as late as possible in the time needed to present the stream.

Figure 7:
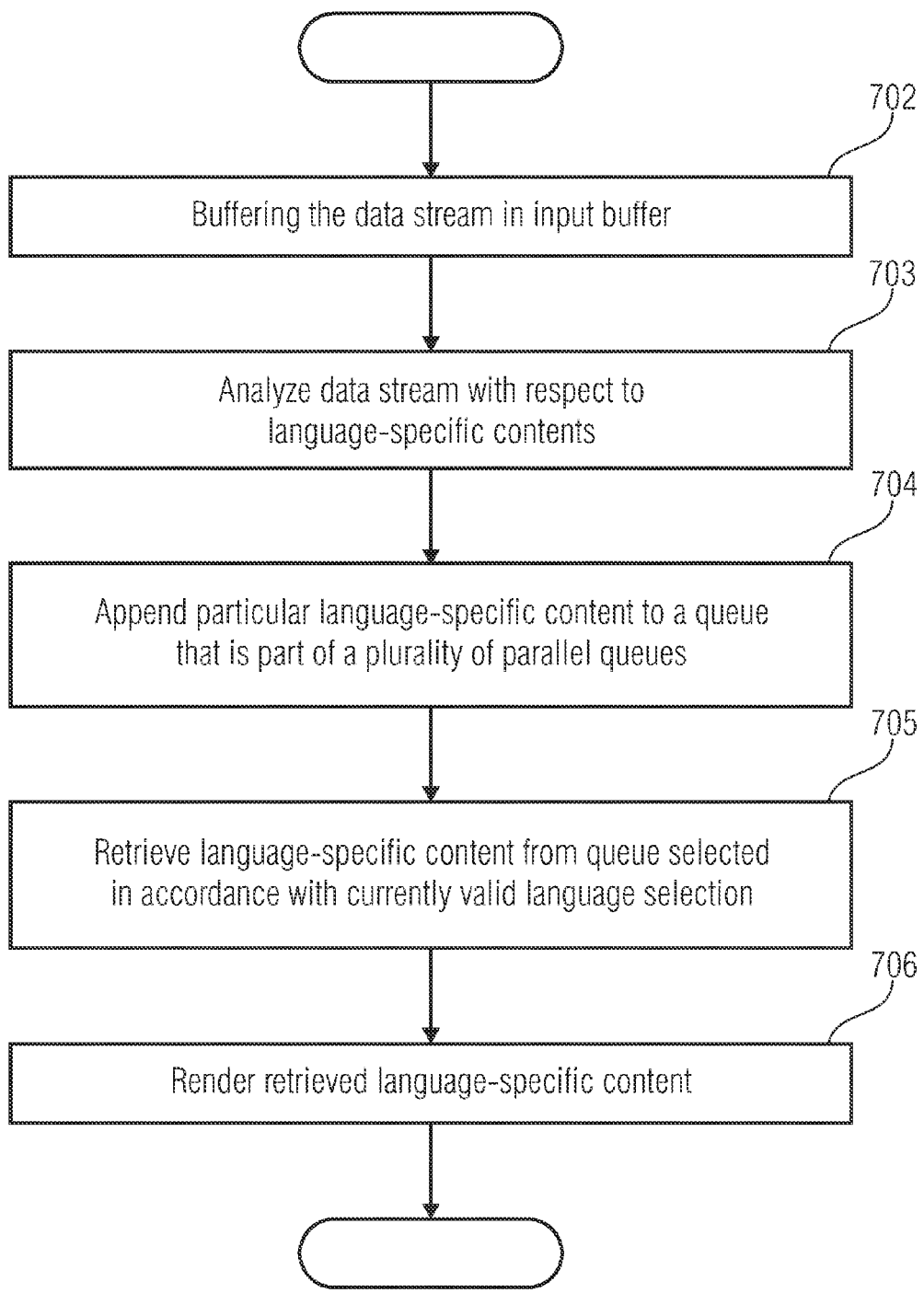
FIG. 7 shows a schematic flowchart of a method for processing a data stream having audio and video data according to the teachings disclosed herein.

FIG. 7 shows a schematic flowchart of a method for data processing a data stream having audio and video data. After the start of the method the data stream is buffered in an input buffer, as indicated at an action 702. At 703 the data stream is analyzed with respect to language-specific contents, or more precisely with respect to information on language-specific contents such as a program identifier. On the basis of a result of the analysis of the information on language-specific content, a particular language-specific content is appended to a queue that is part of a plurality of parallel queues, at an action 704. In this manner, each queue of the plurality of parallel queues contains consecutive data items having language-specific content of the same language.

At an action 705 the language-specific content is retrieved from a queue that is currently selected in accordance with a currently valid language selection. The language selection is typically based on a user input. Then, at 706, the retrieved language-specific content is extracted and forwarded to a subsequent processing stage by a feeder. After the action 706, the method ends.

Due to the quasi-endless nature of the data stream and the necessity to process the data stream in a piece-wise manner, it is to be understood that the method shown in FIG. 7 is meant to operate on pieces of the data stream at a time and then to repeat itself in an iterative manner.

To support trick play, the reading side and the harvesting side has to be switched to an I-frames mode. To this end, the reader provides some decision-making functionality regarding what type of packets should be read (e.g. by seeking in the stream) and to deliver only such packets into the queues of the queuing buffer 110. This logic can also be implemented as a policy for optimal adaptation to BD-ROM. On the feeder's side, a logic may be implemented to deliver from the queue only I-frames. Thus, a flying change from normal playback to trick playback is possible, while still some normal data is present in the queues.

One option for memory management is to allocate all memory needed for the buffers on the heap on demand. Since no copying of the once allocated buffers is needed, the amount of needed memory is proportional to the bitrate of the data stream multiplied by the time depth for the buffering. All buffer slices may share the same memory. The freeing of the buffer memory happens automatically when no buffer (or buffer slice) exists any longer for the data that becomes invalid because the playlist time stamp is older than $t_{now}$. By extending a class used for implementing the input buffer internally with a buffer allocation strategy, the usage of a "new" operation and a "delete" operation for the stream data on the heap can be dispensed with.

Remarks Regarding Latency

With respect to the latency, a component would be "ideal" if the component reacts instantly and has no latencies at all. In a latency-optimized implementation, all timing-related operations would take "no execution time" and thus every state change would be instantaneous. For a BD-ROM implementation, the stream processor should be modeled as close as possible to the requirement of the BD-ROM classification. In the BD-ROM classification the functionality, that would form an equivalent to a software stream processor, are the (hardware) decoders and renderers of audio/video. These decoders and renderers are only fed with the right amount of data. This data is then brought into display/sound within the minimal amount of time and there is no other logic (e.g. decisions whether it still needs to be presented or not) applied to it.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein (not to be confused with the audiovisual data stream). The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A data processor for processing a data stream comprising audio and video data, comprising:
   an input buffer configured to buffer the data stream;
   a data stream analyzer programmed and configured to analyze the data stream to find information on a plurality of language-specific contents in different languages;
   a queuing buffer configured to queue a plurality of parallel queues, each queue including only references to language-specific contents in the same distinct language, wherein the reference point to input buffer items in the input buffer; and
   a feeder programmed and configured to extract the references to language-specific contents from a selected queue in accordance with a language selection signal and to feed the extracted references to the language-specific contents to subsequent data processing stages, wherein the references to the language-specific contents in a non-selected queue are not fed to the subsequent data processing stages;
   wherein at least one of the input buffer, the data stream analyzer, the queuing buffer, and the feeder comprises a hardware implementation.

2. The data processor according to claim 1, wherein the data stream originates from one of an optical disk, a magnetic disk, a hard drive, a network, a Digital Versatile Disk, and a Blu-ray disk.

3. The data processor according to claim 1, wherein the input buffer is adapted to buffer source packets.

4. The data processor according to claim 1, further comprising a data stream decrypter upstream of the data stream analyzer.

5. The data processor according to claim 1, wherein the information on language-specific contents is a program identifier.

6. The data processor according to claim 1, further comprising a time stamp generator adapted to determine playlist time stamps for items to be queued in the plurality of parallel queues and to apply the playlist time stamps to the items.

7. The data processor according to claim 1, wherein the queuing buffer is adapted to append items to the plurality of parallel queues in accordance with the information on the plurality of language-specific contents and an order defined by time stamps of sections of the data stream.

8. The data processor according to claim 1, wherein the queuing buffer is adapted to receive a plurality of references to input buffer items in the input buffer so that the queuing of the plurality of queues is achieved by inserting a reference of the plurality of references according to a queuing scheme, the reference pointing to an input buffer item in the input buffer.

9. The data processor according to claim 1, wherein the feeder is further adapted to retrieve and discard expired content from the non-selected queue.

10. The data processor according to claim 1, wherein the language-specific content is one of an audio stream, a subtitle, a presentation graphic, an interactive graphic, and a credits section of an audio and video presentation.

11. A method for processing a data stream comprising audio and video data, comprising:
   buffering the data stream in an input buffer;
   analyzing the data stream to find information on a plurality of language-specific contents in different languages;
   appending information regarding a particular language-specific content to a queue of a plurality of parallel queues, the information in each queue including only references to language-specific content in the same language, the information regarding the particular language-specific content being appended to a parallel queue of the same distinct language, wherein the references point to input buffer items in the input buffer;
   retrieving the references to the language-specific content from a parallel queue selected in accordance with a currently valid language selection signal; and
   feeding the retrieved references to the language-specific content to a subsequent processing stage, wherein the references to the language-specific content of a non-selected parallel queue are not fed to the subsequent processing stage.

12. The method according to claim 11, further comprising:
   determining playlist time stamps for items to be queued in the plurality of parallel queues;
   applying the playlist time stamps to the items.

13. The method according to claim 11,
   wherein the appending of a particular language-specific content to the queue in the same language is done in accordance with the information on the language-specific contents and an order defined by time stamps of sections of the data stream.

14. The method according to claim 11, further comprising:
   retrieving and discarding expired language-specific content from non-selected queues.

15. A non-transitory computer readable digital storage medium comprising stored thereon a computer program code for performing, when running on a computer, a method for processing a data stream comprising audio and video data, the method comprising:
   buffering the data stream in an input buffer;
   analyzing the data stream to find information on a plurality of language-specific contents in different languages;
   appending information regarding a particular language-specific content to a queue of a plurality of parallel queues, the information in each queue including only references to language-specific content in the same language, the information regarding the particular language-specific content being appended to a parallel queue of the same distinct language, wherein the references point to input buffer items in the input buffer;
   retrieving the references to the language-specific content from a parallel queue selected in accordance with a currently valid language selection signal; and
   feeding the retrieved references to the language-specific content to a subsequent processing stage, wherein the references to the language-specific content of a non-selected parallel queue are not fed to the subsequent processing stage.

16. The data processor according to claim 1, wherein:
   one of the subsequent processing stages is a data renderer;
   the feeder is programmed and configured to feed the extracted references to the language-specific contents to the data renderer; and
   the data renderer is programmed and configured to use the extracted references to query the input buffer for the input buffer items referenced by the extracted references.

17. The method according to claim 11, wherein:
   the subsequent processing stage is a data renderer;
   the feeding includes feeding the extracted references to the language-specific contents to the data renderer; and
   the method further includes a step of using, by the data renderer, the extracted references to query the input buffer for the input buffer items referenced by the extracted references.

* * * * *